UNITED STATES PATENT OFFICE.

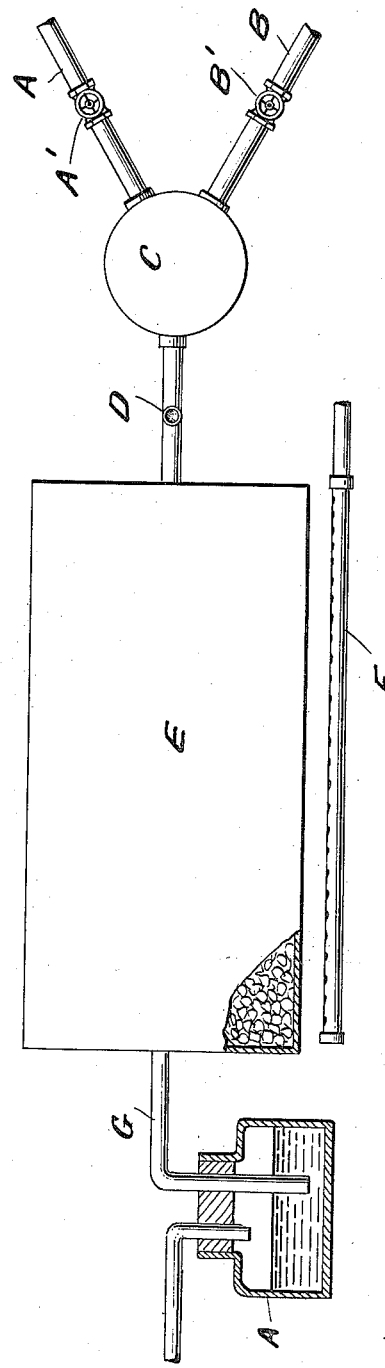

ARNOLD H. PETER, OF NEW YORK, N. Y., ASSIGNOR TO ROYAL BAKING POWDER COMPANY, OF NEW YORK, N. Y., A CORPORATION OF NEW JERSEY.

PROCESS OF MANUFACTURE OF HYDROCHLORIC ACID.

1,229,509. Specification of Letters Patent. Patented June 12, 1917.

Application filed April 12, 1912. Serial No. 690,247.

*To all whom it may concern:*

Be it known that I, ARNOLD H. PETER, a citizen of Switzerland, residing in the city of New York, in the State of New York, have invented new and useful Improvements in the Process of Manufacture of Hydrochloric Acid, of which the following is a specification.

This invention relates to the manufacture of hydrochloric acid and has for its object the production of purer hydrochloric acid than heretofore commercially known by more economical means than those heretofore practised.

The hydrochloric acid heretofore commercially known contains traces of various impurities, as arsenic, iron and sulfuric acid. With the object of eliminating such impurities, distillation has been suggested and practised, but on account of the slightly volatile nature of arsenic, iron and sulfuric acid, especially in the presence of hydrochloric acid gas, which serves as a carrier, some impurities are found in the completed product even when this additional expense is incurred in their manufacture and they are claimed to be chemically pure. This invention contemplates a process such that none of these impurities is present at any stage of the manufacture. According to the process of this invention, hydrochloric acid is produced from chlorin by means of water-vapor. I believe that I am the first to discover that by properly proportioning the chlorin and water-vapor, hydrochloric acid can be produced at low temperature and the first to provide means by which the proper proportioning may be determined and accomplished.

In carrying out the process of the present invention, the chlorin in contact with water or water-vapor forms hydrochloric acid and liberates oxygen and in order to accelerate the latter reaction it is desirable to have present a substance or substances to take hold of the oxygen, as, for example, carbon or sulfur, and I prefer to use carbon in the form of charcoal or coke.

In converting chlorin into hydrochloric acid, it is of great importance that the conversion take place at low temperature for many reasons, among which may be mentioned the avoidance of the corrosive action of hydrochloric acid gas at high temperatures, which is destructive of the apparatus, the difficulties and expense of condensation of hydrochloric acid gas from high temperatures, the avoidance of the gaseous and solid substances (chlorinated) which are formed at high temperatures, and the avoidance of the impurities which occur in hydrochloric acid converted at high temperatures. By the process of the present invention, the chlorin may be converted quantitatively into hydrochloric acid at a temperature as low as 200° C., and the chlorin may be converted into hydrochloric acid at temperatures just above boiling point of water. The advantages of this over any process involving the use of hydrochloric acid at high temperature, varying from red heat upward, are of vital importance commercially and technically.

The process may best be practised by an apparatus comprising means for bringing together chlorin and water-vapor, means for observing the color of the mixture and regulating its proportions accordingly, means for conducting the mixture into contact with carbon at proper temperature, and condensing means. The instrumentalities employed may vary within considerable limits according to practical conditions encountered. Thus, the chlorin and water-vapor may be brought together in various ways and either before entering the converter or in it. The means for regulating the proportions of the mixture may be of any desired character and either such that changes may be made from time to time or such that the proportions being once determined according to the particular conditions no provision is made for further regulation. So, too, the mixture may be treated with the carbon in a variety of ways. The variations in different features are chiefly important as affecting the yield. The more accurately the process is practised, the better the results obtained.

In the accompanying drawing is illustrated one preferred form of apparatus by which the invention may be practised: A is a pipe leading from a source of chlorin, not shown, provided with a control valve A'. B is a pipe leading from a source of steam, not shown, provided with a control valve B', the two pipes meeting at a point C, which preferably is in the form of a mixing chamber provided with baffles or other means to secure a thorough mixture. D represents a portion of the passage through which the mixture passes, which portion is provided with means whereby the color of the mixture may be observed, as for example, a section or piece of glass or other transparent material. E represents a chamber or vessel adapted to receive the carbon hereinafter referred to and provided with heating means, as, for example, the gas burner indicated in the drawing F. G represents the exit pipe, which is preferably connected with condensing means, as, for example, a vessel containing water, as illustrated at H.

It is of great importance to have the chlorin and water-vapor properly proportioned, if good results are to be obtained. The proper proportions will vary according to conditions. The invention provides simple and effective means whereby the proper proportioning of the mixture may be easily determined and accomplished. I have discovered that if the mixture of chlorin and water-vapor shows green color against a white background, then chlorin will pass the converter even at a high temperature, whereas if the mixture of chlorin and water-vapor does not show green color against a white background but is substantially colorless, then the formation of hydrochloric acid will take place quantitatively even at a low temperature. And there is accordingly provided in the apparatus means for observing the color of the mixture, as, for example, the transparent piece indicated at D.

It will be understood that the amount of water-vapor should be such that when it is brought in contact with the chlorin the green color (against a white background) will be eliminated. The process may be practised without making the mixture such that it is completely colorless, but for the best results the water-vapor admitted should be sufficient to make the green color disappear, the yields depending upon the accuracy with which the process is practised. Under ordinary atmospheric pressure and at a temperature of 200° C., a mixture of about seven ounces of water (in the form of vapor) to three ounces of chlorin is best. For good results the proportion of water to chlorin under such conditions should not be less than two to one.

While I have shown a steam pipe as the preferred means for bringing the water-vapor in contact with the chlorin, it will be understood that other means may be employed. For example, the chlorin may be conducted into water and rising therethrough become mixed with water-vapor and thence conducted into the converter. The best results as to rapidity of operation and quantity of output are obtained by the use of steam.

I claim:—

1. A process for making hydrochloric acid comprising the conversion of chlorin into hydrochloric acid by means of water-vapor and carbon at a temperature lower than red heat.

2. A process for making hydrochloric acid comprising the conversion of chlorin into hydrochloric acid by means of water-vapor and carbon at a temperature between the boiling point of water and red heat.

3. A process for making hydrochloric acid comprising forming an approximately colorless mixture of chlorin and water-vapor and conducting said mixture over carbon at a temperature between the boiling point of water and red heat.

4. A process for making hydrochloric acid, comprising forming a mixture of chlorin and such an amount of water-vapor that the mixture shows substantially no green color when observed against a white background, and treating such mixture with carbon at a suitable temperature.

5. A process for making hydrochloric acid comprising forming a mixture of chlorin and water-vapor in approximately the proportion by weight of three to seven, and conducting said mixture over carbon at a suitable temperature.

6. A process for making hydrochloric acid comprising forming a mixture of chlorin and water-vapor in approximately the proportion by weight of three to seven, and conducting said mixture over carbon at a temperature between the boiling point and red heat.

7. A process for making hydrochloric acid comprising forming a mixture of chlorin and water-vapor wherein the proportion of water-vapor to chlorin is by weight at least two to one, and treating said mixture with carbon at a temperature between the boiling point and red heat.

ARNOLD H. PETER.

Witnesses:
A. M. HOUGHTON,
HERMAN GUSTOW.